United States Patent
Seaton et al.

(10) Patent No.: US 11,537,903 B2
(45) Date of Patent: *Dec. 27, 2022

(54) SYSTEMS AND METHODS FOR REDUCING MANUFACTURING FAILURE RATES

(71) Applicant: Palantir Technologies Inc., Palo Alto, CA (US)

(72) Inventors: William Seaton, New York, NY (US); Clemens Wiltsche, London (GB); Myles Novick, New York, NY (US); Rootul Patel, New York, NY (US)

(73) Assignee: Palantir Technologies Inc., Palo Alto, CA (US)

(*) Notice: Subject to any disclaimer, the term of this patent is extended or adjusted under 35 U.S.C. 154(b) by 543 days.

This patent is subject to a terminal disclaimer.

(21) Appl. No.: 16/573,953

(22) Filed: Sep. 17, 2019

(65) Prior Publication Data
US 2020/0012950 A1    Jan. 9, 2020

Related U.S. Application Data

(63) Continuation of application No. 15/590,959, filed on May 9, 2017, now Pat. No. 10,482,382.

(51) Int. Cl.
*G06N 5/02*     (2006.01)
*G06Q 10/06*    (2012.01)

(52) U.S. Cl.
CPC ............ *G06N 5/022* (2013.01); *G06Q 10/06* (2013.01)

(58) Field of Classification Search
None
See application file for complete search history.

(56) References Cited

U.S. PATENT DOCUMENTS

| | | |
|---|---|---|
| 6,374,251 B1 | 4/2002 | Fayyad et al. |
| 6,567,936 B1 | 5/2003 | Yang et al. |
| 6,775,675 B1 | 8/2004 | Nwabueze et al. |
| 6,980,984 B1 | 12/2005 | Huffman et al. |
| 7,373,669 B2 | 5/2008 | Eisen |
| 7,451,397 B2 | 11/2008 | Weber et al. |
| 7,574,409 B2 | 8/2009 | Patinkin |
| 7,596,285 B2 | 9/2009 | Brown et al. |
| 7,783,658 B1 | 8/2010 | Bayliss |
| 7,805,457 B1 | 9/2010 | Viola et al. |

(Continued)

FOREIGN PATENT DOCUMENTS

| | | |
|---|---|---|
| EP | 1191463 A2 | 3/2002 |
| EP | 2555153 A1 | 2/2013 |

(Continued)

OTHER PUBLICATIONS

U.S. Pat. No. 8,712,906 B1, Apr. 2014, Sprague et al. (withdrawn).

(Continued)

*Primary Examiner* — Daniel T Pellett
(74) *Attorney, Agent, or Firm* — Sheppard Mullin Richter & Hampton LLP

(57) ABSTRACT

Systems and methods are provided for reducing failure rates of a manufactured products. Manufactured products may be clustered together according to similarities in their production data. Manufactured product clusters may be analyzed to determine mechanisms for failure rate reduction, including adjustments to test quality parameters, product formulas, and product processes. Recommended product adjustments may be provided.

17 Claims, 4 Drawing Sheets

(56) References Cited

U.S. PATENT DOCUMENTS

| | | |
|---|---|---|
| 7,814,102 B2 | 10/2010 | Miller et al. |
| 7,865,427 B2 | 1/2011 | Wright et al. |
| 8,046,362 B2 | 10/2011 | Bayliss |
| 8,135,679 B2 | 3/2012 | Bayliss |
| 8,135,719 B2 | 3/2012 | Bayliss |
| 8,266,168 B2 | 9/2012 | Bayliss |
| 8,301,904 B1 | 10/2012 | Gryaznov |
| 8,312,546 B2 | 11/2012 | Alme |
| 8,321,943 B1 | 11/2012 | Walters et al. |
| 8,347,398 B1 | 1/2013 | Weber |
| 8,447,674 B2 | 5/2013 | Choudhuri et al. |
| 8,484,168 B2 | 7/2013 | Bayliss |
| 8,495,077 B2 | 7/2013 | Bayliss |
| 8,498,969 B2 | 7/2013 | Bayliss |
| 8,554,653 B2 | 10/2013 | Falkenborg et al. |
| 8,560,413 B1 | 10/2013 | Quarterman |
| 8,600,872 B1 | 12/2013 | Yan |
| 8,682,812 B1 | 3/2014 | Ranjan |
| 8,726,379 B1 | 5/2014 | Stiansen et al. |
| 8,788,405 B1 | 7/2014 | Sprague et al. |
| 8,788,407 B1 | 7/2014 | Singh et al. |
| 8,818,892 B1 | 8/2014 | Sprague et al. |
| 9,009,827 B1 | 4/2015 | Albertson et al. |
| 9,043,894 B1 | 5/2015 | Dennison et al. |
| 9,135,658 B2 | 9/2015 | Sprague et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,230,280 B1 | 1/2016 | Maag et al. |
| 9,256,664 B2 | 2/2016 | Chakerian et al. |
| 9,344,447 B2 | 5/2016 | Cohen et al. |
| 9,367,872 B1 | 6/2016 | Visbal et al. |
| 9,436,745 B2 | 9/2016 | Nordstrom |
| 2003/0033228 A1 | 2/2003 | Bosworth-Davies et al. |
| 2003/0074368 A1 | 4/2003 | Schuetze et al. |
| 2003/0097330 A1 | 5/2003 | Hillmer et al. |
| 2003/0154044 A1 | 8/2003 | Lundstedt et al. |
| 2004/0117152 A1 | 6/2004 | Shafer |
| 2004/0205524 A1 | 10/2004 | Richter et al. |
| 2005/0108063 A1 | 5/2005 | Madill et al. |
| 2005/0222928 A1 | 10/2005 | Steier et al. |
| 2006/0095521 A1 | 5/2006 | Patinkin |
| 2006/0218637 A1 | 9/2006 | Thomas et al. |
| 2007/0106582 A1 | 5/2007 | Baker et al. |
| 2007/0192265 A1 | 8/2007 | Chopin et al. |
| 2007/0294200 A1 | 12/2007 | Au |
| 2008/0133567 A1 | 6/2008 | Ames et al. |
| 2008/0148398 A1 | 6/2008 | Mezack et al. |
| 2008/0288425 A1 | 11/2008 | Posse et al. |
| 2008/0319951 A1 | 12/2008 | Ueno |
| 2009/0018940 A1 | 1/2009 | Wang et al. |
| 2009/0024505 A1 | 1/2009 | Patel et al. |
| 2009/0044279 A1 | 2/2009 | Crawford et al. |
| 2009/0082997 A1 | 3/2009 | Tokman et al. |
| 2009/0083184 A1 | 3/2009 | Eisen |
| 2009/0172821 A1 | 7/2009 | Daira et al. |
| 2009/0192957 A1 | 7/2009 | Subramanian et al. |
| 2009/0254970 A1 | 10/2009 | Agarwal et al. |
| 2009/0254971 A1 | 10/2009 | Herz |
| 2009/0271359 A1 | 10/2009 | Bayliss |
| 2009/0300589 A1 | 12/2009 | Watters et al. |
| 2009/0318775 A1 | 12/2009 | Michelson et al. |
| 2010/0077481 A1 | 3/2010 | Polyakov et al. |
| 2010/0077483 A1 | 3/2010 | Stolfo et al. |
| 2010/0100963 A1 | 4/2010 | Mahaffey |
| 2010/0106611 A1 | 4/2010 | Paulsen et al. |
| 2010/0125546 A1 | 5/2010 | Barrett et al. |
| 2010/0169237 A1 | 7/2010 | Howard et al. |
| 2010/0185691 A1 | 7/2010 | Irmak et al. |
| 2010/0306029 A1 | 12/2010 | Jolley |
| 2010/0330801 A1 | 12/2010 | Rouh |
| 2011/0055140 A1 | 3/2011 | Roychowdhury |
| 2011/0087519 A1 | 4/2011 | Fordyce, III et al. |
| 2011/0093327 A1 | 4/2011 | Fordyce, III et al. |
| 2011/0131122 A1 | 6/2011 | Griffin et al. |
| 2011/0167025 A1 | 7/2011 | Danai |
| 2011/0167054 A1 | 7/2011 | Bailey et al. |
| 2011/0167493 A1 | 7/2011 | Song et al. |
| 2011/0173093 A1 | 7/2011 | Psota et al. |
| 2011/0178842 A1 | 7/2011 | Rane et al. |
| 2011/0219450 A1 | 9/2011 | McDougal et al. |
| 2011/0225650 A1 | 9/2011 | Margolies et al. |
| 2011/0231223 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowitz |
| 2011/0307382 A1 | 12/2011 | Siegel et al. |
| 2011/0314546 A1 | 12/2011 | Aziz et al. |
| 2012/0004904 A1 | 1/2012 | Shin et al. |
| 2012/0084135 A1 | 4/2012 | Nissan et al. |
| 2012/0084866 A1 | 4/2012 | Stolfo |
| 2012/0131107 A1 | 5/2012 | Yost |
| 2012/0158626 A1 | 6/2012 | Zhu et al. |
| 2012/0215898 A1 | 8/2012 | Shah et al. |
| 2012/0254129 A1 | 10/2012 | Wheeler et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0151388 A1 | 6/2013 | Falkenborg et al. |
| 2013/0160120 A1 | 6/2013 | Malaviya et al. |
| 2013/0166550 A1 | 6/2013 | Buchmann et al. |
| 2013/0185320 A1 | 7/2013 | Iwasaki et al. |
| 2013/0197925 A1 | 8/2013 | Blue |
| 2013/0211985 A1 | 8/2013 | Clark et al. |
| 2013/0232045 A1 | 9/2013 | Tai et al. |
| 2013/0276799 A1 | 10/2013 | Davidson |
| 2013/0318594 A1 | 11/2013 | Hoy et al. |
| 2013/0339218 A1 | 12/2013 | Subramanian et al. |
| 2013/0339514 A1 | 12/2013 | Crank et al. |
| 2014/0006109 A1 | 1/2014 | Callioni et al. |
| 2014/0032506 A1 | 1/2014 | Hoey et al. |
| 2014/0058763 A1 | 2/2014 | Zizzamia et al. |
| 2014/0081652 A1 | 3/2014 | Klindworth |
| 2014/0129261 A1 | 5/2014 | Bothwell et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0283067 A1 | 9/2014 | Call et al. |
| 2014/0310282 A1 | 10/2014 | Sprague et al. |
| 2014/0331119 A1 | 11/2014 | Dixon et al. |
| 2014/0379812 A1 | 12/2014 | Bastide et al. |
| 2015/0067533 A1 | 3/2015 | Volach |
| 2015/0178825 A1 | 6/2015 | Huerta |
| 2015/0235334 A1 | 8/2015 | Wang et al. |
| 2016/0004764 A1 | 1/2016 | Chakerian et al. |
| 2016/0034470 A1 | 2/2016 | Sprague et al. |
| 2016/0048937 A1 | 2/2016 | Mathura et al. |
| 2016/0180451 A1 | 6/2016 | Visbal et al. |
| 2016/0306332 A1 | 10/2016 | Hill |
| 2017/0116319 A1 | 4/2017 | Zhou |
| 2017/0270183 A1 | 9/2017 | Kuroda |

FOREIGN PATENT DOCUMENTS

| | | |
|---|---|---|
| EP | 2911078 A2 | 8/2015 |
| EP | 2963577 A1 | 1/2016 |
| EP | 2985729 A1 | 2/2016 |
| EP | 3018879 A1 | 5/2016 |
| EP | 3037991 A1 | 6/2016 |
| EP | 3038046 A1 | 6/2016 |
| GB | 2513247 A | 10/2014 |
| WO | WO-2008011728 A1 | 1/2008 |

(56) References Cited

FOREIGN PATENT DOCUMENTS

| WO | WO-2008113059 A1 | 9/2008 |
|---|---|---|
| WO | WO-2013126281 A1 | 8/2013 |

OTHER PUBLICATIONS

U.S. Pat. No. 8,725,631 B1, May 2014, Sprague et al. (withdrawn).
Koufteros, Xenophon A. "Testing a model of pull production: a paradigm for manufacturing research using structural equation modeling." Journal of Operations Management 17.4 (1999): 467-488.
"A Word About Banks and the Laundering of Drug Money," Aug. 18, 2012, http://www.golemxiv.co.uk/2012/08/a-word-about-banks-and-the-laundering-o- f-drug-money/.
"Money Laundering Risks and E-Gaming: A European Overview and Assessment," 2009, http://www.cf.ac.uk/socsi/resources/Levi_Final_Money_Laundering_Ris- ks_egaming.pdf.
"Potential Money Laundering Warning Signs," snapshot taken 2003, https://web.archive.ordweb/20030816090055/http:/finsolinc.com/ANTI-MONEY%-20LAUNDERING%20TRAINING%20GUIDES.pdf.
"Using Whois Based Geolocation and Google Maps API for Support Cybercrime Investigations," http://wseas.us/e-library/conferences/2013/Dubrovnik/TELECIRC/TELECIRC-32- .pdf.
Alfred, Rayner "Summarizing Relational Data Using Semi-Supervised Genetic Algorithm-Based Clustering Techniques", Journal of Computer Science, 2010, vol. 6, No. 7, pp. 775-784.
Bhosale, Safal V., "Holy Grail of Outlier Detection Technique: A Macro Level Take on the State of the Art," International Journal of Computer Science & Information Technology, Aug. 1, 2014, retrieved fromhttp://www.ijcsit.com/docs/Volume5/vol5issue04/ijcsit20140504226.pdf retrieved May 3, 2016.
Golmohammadi et al., "Data Mining Applications for Fraud Detection in Securities Market," Intelligence and Security Informatics Conference (EISIC), 2012 European, IEEE, Aug. 22, 2012, pp. 107-114.
Gu et al., "BotMiner: Clustering Analysis of Network Traffice for Protocol-and-Structure-Independent Botnet Detection," USENIX Security Symposium, 2008, 17 pages.
Hodge et al., "A Survey of Outlier Detection Methodologies," Artificial Intelligence Review, vol. 22, No. 2, Oct. 1, 2004.
Keylines.com, "An Introduction to KeyLines and Network Visualization," Mar. 2014, <http://keylines.com/wp-content/uploads/2014/03/KeyLines-White-Paper.p- df> downloaded May 12, 2014 in 8 pages.
Keylines.com, "KeyLines Datasheet," Mar. 2014, <http://keylines.com/wp-content/uploads/2014/03/KeyLines-datasheet.pdf- > downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.p- df> downloaded May 12, 2014 in 10 pages.
Li et al., "Identifying the Signs of Fraudulent Accounts using Data Mining Techniques," Computers in Human Behavior, vol. 28, No. 3, Jan. 16, 2012.
Ngai et al., "The Application of Data Mining Techniques in Financial Fraud Detection: A Classification Frameworok and an Academic Review of Literature," Decision Support Systems, Elsevier Science Publishers, Amsterdam, Netherlands, vol. 50, No. 3,Feb. 1, 2011.
Nolan et al., "MCARTA: A Malicious Code Automated Run-Time Analysis Framework," Homeland Security (HST) 2012 IEEE Conference on Technologies for, Nov. 13, 2012, pp. 13-17.
Notice of Allowance for U.S. Appl. No. 14/139,628 dated Jun. 24, 2015.
Notice of Allowance for U.S. Appl. No. 14/139,640 dated Jun. 17, 2015.
Notice of Allowance for U.S. Appl. No. 14/139,713 dated Jun. 12, 2015.
Notice of Allowance for U.S. Appl. No. 14/264,445 dated May 14, 2015.
Notice of Allowance for U.S. Appl. No. 14/278,963 dated Sep. 2, 2015.
Notice of Allowance for U.S. Appl. No. 14/323,935 dated Oct. 1, 2015.
Notice of Allowance for U.S. Appl. No. 14/473,552 dated Jul. 24, 2015.
Notice of Allowance for U.S. Appl. No. 14/473,860 dated Jan. 5, 2015.
Notice of Allowance for U.S. Appl. No. 14/486,991 dated May 1, 2015.
Notice of Allowance for U.S. Appl. No. 14/579,752 dated Apr. 4, 2016.
Offical Communication for U.S. Appl. No. 14/473,552 dated Feb. 24, 2015.
Official Communication for European Patent Application No. 14159535.5 dated May 22, 2014.
Official Communication for European Patent Application No. 15155845.9 dated Oct. 6, 2015.
Official Communication for European Patent Application No. 15156004.2 dated Aug. 24, 2015.
Official Communication for European Patent Application No. 15175171.8 dated Nov. 25, 2015.
Official Communication for European Patent Application No. 15180515.7 dated Dec. 14, 2015.
Official Communication for European Patent Application No. 15193287.8 dated Apr. 1, 2016.
Official Communication for European Patent Application No. 15201727.3 dated May 23, 2016.
Official Communication for European Patent Application No. 15202090.5 dated May 13, 2016.
Official Communication for Great Britain Application No. 1404457.2 dated Aug. 14, 2014.
Official Communication for Netherlands Patent Application No. 2012433 dated Mar. 11, 2016.
Official Communication for U.S. Appl. No. 14/251,485 dated Oct. 1, 2015.
Official Communication for U.S. Appl. No. 14/264,445 dated Apr. 17, 2015.
Official Communication for U.S. Appl. No. 14/278,963 dated Jan. 30, 2015.
Official Communication for U.S. Appl. No. 14/486,991 dated Mar. 10, 2015.
Official Communication for U.S. Appl. No. 14/518,757 dated Jul. 20, 2015.
Official Communication for U.S. Appl. No. 14/518,757 dated Dec. 1, 2015.
Official Communication for U.S. Appl. No. 14/518,757 dated Apr. 2, 2015.
Official Communication for U.S. Appl. No. 14/579,752 dated Aug. 19, 2015.
Official Communication for U.S. Appl. No. 14/579,752 dated Dec. 9, 2015.
Official Communication for U.S. Appl. No. 14/579,752 dated May 26, 2015.
Official Communication for U.S. Appl. No. 14/581,920 dated Jun. 13, 2016.
Official Communication for U.S. Appl. No. 14/581,920 dated May 3, 2016.
Official Communication for U.S. Appl. No. 14/581,920 dated Mar. 1, 2016.
Official Communication for U.S. Appl. No. 14/639,606 dated Oct. 16, 2015.
Official Communication for U.S. Appl. No. 14/639,606 dated May 18, 2015.
Official Communication for U.S. Appl. No. 14/639,606 dated Apr. 5, 2016.
Official Communication for U.S. Appl. No. 14/639,606 dated Jul. 24, 2015.
Official Communication for U.S. Appl. No. 14/698,432 dated Jun. 3, 2016.

(56) References Cited

OTHER PUBLICATIONS

Official Communication for U.S. Appl. No. 14/726,353 dated Mar. 1, 2016.
Official Communication for U.S. Appl. No. 14/726,353 dated Sep. 10, 2015.
Official Communication for U.S. Appl. No. 14/857,071 dated Mar. 2, 2016.
Official Communication for U.S. Appl. No. 15/072,174 dated Jun. 1, 2016.
Perdisci et al., "Behavioral Clustering of HTTP-Based Malware and Signature Generation Using Malicious Network Traces," USENIX, Mar. 18, 2010, pp. 1-14.
Quartert FS "Managing Business Performance and Detecting Outliers in Financial Services," Oct. 16, 2014, retrieved from https://quartetfs.com/images/pdf/white-papers/Quartet_FS_White_Paper_-_Ac-tivePivot_Sentinel.pdf retrieved on May 3, 2016.
Quartert FS "Resource Center," Oct. 16, 2014, retrieved from https://web.archive.org/web/20141016044306/http://quartetfs.com/resource-- center/white-papers retrieved May 3, 2016.
Restriction Requirement for U.S. Appl. No. 14/857,071 dated Dec. 11, 2015.
Shah, Chintan, "Periodic Connections to Control Server Offer New Way to Detect Botnets," Oct. 24, 2013 in 6 pages, <http://www.blogs.mcafee.com/mcafee-labs/periodic-links-to-control-ser- ver-offer-new-way-to-detect-botnets>.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Symantec Corporation, "E-Security Begins with Sound Security Policies," Announcement Symantec, Jun. 14, 2001.
Wiggerts, T.A., "Using Clustering Algorithms in Legacy Systems Remodularization," Reverse Engineering, Proceedings of the Fourth Working Conference, Netherlands, Oct. 6-8, 1997, IEEE Computer Soc., pp. 33-43.

SYSTEMS AND METHODS FOR REDUCING MANUFACTURING FAILURE RATES

CROSS REFERENCE TO RELATED APPLICATIONS

This application is a continuation application of U.S. patent application Ser. No. 15/590,959, filed May 9, 2017, the content of which is incorporated by reference in its entirety into the present disclosure.

FIELD OF THE INVENTION

This disclosure relates to approaches for reducing manufacturing failure rates.

BACKGROUND

Under conventional approaches, analysis of manufacturing formulas and processes may be difficult to perform due to a lack of data. Products having matching formulas and processes may be manufactured in relatively small amounts. When manufacturing rates for a particular product are low, there may not be enough data to perform a proper analysis of failure rates and causes. These and other drawbacks exist with conventional defect management systems.

SUMMARY

A claimed solution rooted in computer technology provides methods and systems of adjusting manufacturing processes and formulas according to improved analysis techniques. For example, the improved analysis techniques may involve clustering products according to product formulas to generate larger data sets that may provide additional insight when analyzed. Failure of a manufactured product may occur when that product fails one or more post-production tests. Failure rates of product clusters, rather than individual products, may be analyzed, thus providing information about the relationship between particular formula ingredients and test failure rates. In some implementations, these failure rates may be improved through a variety of techniques, including improvements to failure measurement (e.g., quality parameter adjustment and process review time window adjustment), improvements to formulas (e.g., by finding correlations between ingredients and test results and prediction of future test results), and improvements to processes (e.g., by comparing actual test results to test results predicted according to a materials bill).

In some implementations, the system may be applied to manufactured products produced in batches where all of the products in a batch are identical. According to the system, different manufactured products may be clustered according to similarities in their production, e.g., their formulas. Thus, although a single product may have a small number of batches providing data points, a cluster of products may include enough produced batches to provide data points sufficient for drawing conclusions about the success rates of ingredients and formulas used to produce the batches. The clustered products may be analyzed to determine optimal methods for reducing failure rates in the manufacturing process. Failure rate reduction methods may include process alteration, ingredient alteration, and quality parameter alteration.

Although systems and methods are described herein may reference specific manufacturing processes, it will be appreciated that the described systems and methods may apply to other types of processes as well (e.g., industrial control processes).

In some implementations, a system for reducing failure rates of a manufactured product may include one or more processors and a memory storing instructions. When executed by the one or more processors, the instructions may cause the system to perform receiving a first product data set, the first product manufacturing data set including a first product formula, a plurality of first product examples, and first test results of the plurality of first product examples, receiving a second product data set, the second product manufacturing data set including a second product formula, a plurality of second product examples, and second test results of the plurality of second product examples, determining a first product cluster including the first product data set and the second product data set according to a comparison between the first product formula and the second product formula, and determining a failure rate reduction mechanism of at least one product of the first product cluster.

In another implementation, a computer implemented method for reducing failure rates of a manufactured product is provided. The method may be performed on a computer system having one or more physical processors programmed with computer program instructions that, when executed by the one or more physical processors, cause the computer system to perform the method. The method may include receiving, by the computer system, a first product data set, the first product manufacturing data set including a first product formula, a plurality of first product examples, and first test results of the plurality of first product examples, receiving, by the computer system, a second product data set, the second product manufacturing data set including a second product formula, a plurality of second product examples, and second test results of the plurality of second product examples, determining, by the computer system, a first product cluster including the first product data set and the second product data set according to a comparison between the first product formula and the second product formula, and determining, by the computer system, a failure rate reduction mechanism of at least one product of the first product cluster.

In another implementation, a system for predicting failure rates of a product to be manufactured may include one or more processors and a memory storing instructions. When executed by the one or more processors, the instructions may cause the system to perform receiving a first product data set, the first product manufacturing data set including a first product formula, a plurality of first product examples, and first test results of the plurality of first product examples, receiving a second product data set, the second product manufacturing data set including a second product formula, a plurality of second product examples, and second test results of the plurality of second product examples, determining a first product cluster including the first product data set and the second product data set according to a comparison between the first product formula and the second product formula, generating, by the computer system, a correlation model according to an in-common ingredient in the first product formula and the second product formula and an in-common test result of the first test results and the second test results, receiving a third product formula, and predicting at least one test result of a third product manufactured according to the third product formula based on the correlation model.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

The technology described herein relates to systems and methods for reducing manufacturing failure rates. The systems and methods may be used to analyze product manufacturing data, including product formulas, product processing information, failure rates, and testing quality parameters. The systems and methods described herein may, at times, refer to manufacturing techniques, ingredients, and/or products. It is to be understood, however, that the systems and methods described are not limited to any specific manufacturing techniques, ingredients, products, etc., and that the systems and methods may be applied to a variety of manufacturing systems and circumstances.

Figure 1:
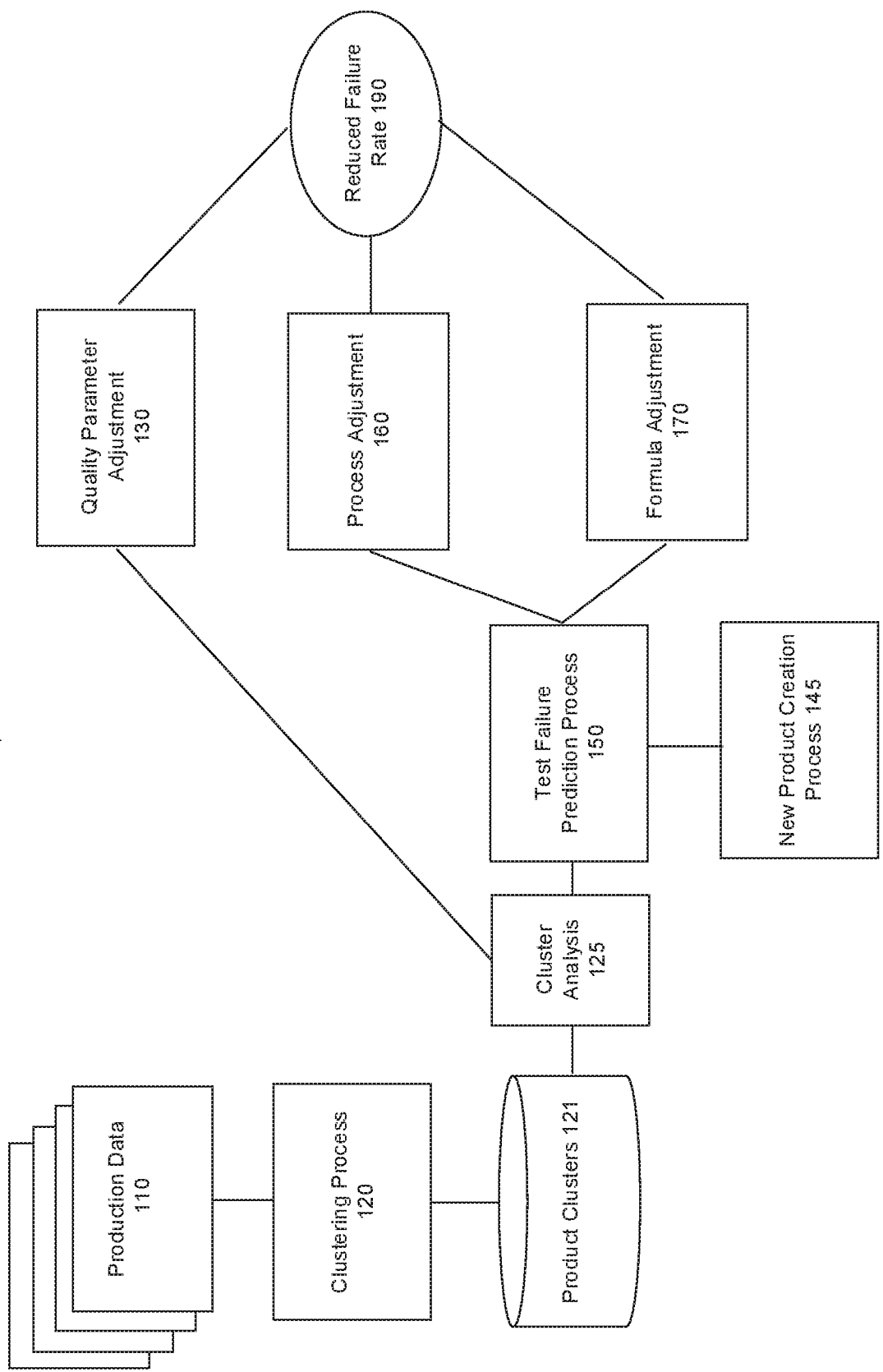
FIG. 1 illustrates a process flow of a system for reducing product manufacturing failure rates.

FIG. 1 illustrates an exemplary process flow of a system for reducing manufacturing failure rates. The system may be used to analyze production data 110 and accordingly, adjust product quality parameters 130, adjust product processes 160, and/or adjust product formulas 170 to arrive at a reduced failure rate 190.

Production data 110 may include manufacturing information about the production and testing of products. Production data 110 may include any and all data describing the production and testing of products including, for example, bills of materials, ingredient formulas, processing plans (e.g., temperature, pressure, mixing speed, times, etc.), tests conducted, test results, and/or any other suitable information about the production of a product. Production data 110 may include, for example, one or more product data sets, each including product formulas, product examples, and test results of the product examples. Product examples may include information about manufactured batches of each product, including date manufactured, amount manufactured, and any other relevant information. Thus, production data 110 may include all of the above information about multiple individual products and multiple batches of the individual products.

Clustering process 120 may be used to cluster products according to a comparison of their production data 110. For example, products may be clustered based on the similarities between products as indicated by the production data 110. In some implementations, products may be clustered according to product ingredient formulas. Product clustering may include normalizing a product's formula. In some embodiments, normalizing a product formula involves defining the product ingredients by percentage weight in the total composition of the product.

Normalized product formulas may be compared across all products in the production data 110 based on term frequency-inverse document frequency (TF-IDF) scoring. TF-IDF scores, as used on the ingredient formulas of products, weight the ingredients of each product according to its percentage composition of the whole product normalized against the frequency of that ingredient in all of the products that are analyzed. For example, TF-IDF weighting of an ingredient for a specific product is increased according to the weight of the ingredient in the specific product and decreased according to the frequency of the ingredient in the other products in the dataset. The TF-IDF score for each ingredient in a product may be computed as follows:

$$tf - idf(i, p) = (\text{percentage weight ingredient } i \text{ occurs in product } p) * \log\left(\frac{\text{\#products}}{1 + (\text{\#products including ingredient } i)}\right).$$

The formula provided above multiplies the ingredient weight within a product by the inverse of the frequency of that ingredient in all products. The ingredient frequency is computed as the percentage weight of the ingredient i in the product p. The inverse document frequency (IDF) is computed as the logarithm of the total number of products divided by one plus the number of products containing the ingredient i. Thus, for example, ingredients that occur more frequently in all products (e.g., water) may have a low IDF while rare ingredients may have a high IDF. The term inside the logarithm of the IDF calculation approaches one as the number of products containing the term increases. Thus, the IDF approaches zero. Accordingly, for extremely common ingredients such as water, the TF-IDF score approaches zero. Thus, the TF-IDF method scores each ingredient based on its corresponding percentage in the product composition offset by how frequently the ingredient appears in other products.

In some implementations, the IDF of products that correspond to the production data 110 may be computed prior to clustering analysis. IDF data may be stored as production data 110 for all ingredients used by products in the production data 110. When new product information is added, the IDF data may be adjusted accordingly. Computing and storing IDF information of products that correspond to the production data 110 may reduce a computational load analysis.

In some implementations, the products may be clustered based on their respective TF-IDF scores at a clustering process 120 to produce multiple product clusters 121. Clustering may be used to determine a set of cluster centers that minimize the variance across product data sets in the production data 110 between each data point and the nearest cluster center to that data point. A clustering process 120 may therefore produce a number of product clusters 121, defined by cluster centers, each containing one or more products. Any generally known clustering technique may be used for clustering including, for example, k-means and/or k-means++. In some implementations, a k-means++ technique may be used to produce a predetermined number of product clusters. During clustering, the predetermined number of clusters may be altered to produce optimally sized clusters. That is, a predetermined number of clusters may be tuned up or down to ensure that most clusters are large enough to analyze while remaining small enough so as to differentiate products sufficiently. In some implementations, products may be clustered according to other aspects of production data 110, including processing plans, and any other data.

The product clusters 121 may be analyzed to determine failure rates within each cluster during product cluster analysis 125. Failure rates may be determined for each cluster according to total failure rates on all tests and/or according to failure rates on specific tests. The analysis may be used by a user examining the data and/or by the system making autonomous decisions based on the failure rates to determine which product clusters 121 are affecting overall production failure rates most significantly. In some implementations, product cluster failure rate data may be used, for example, to select or prioritize a specific product cluster for improvement, for example, due to the product cluster having a higher rate of failure in comparison to other product clusters. Product cluster analysis may also provide information identifying failure rates on specific tests. That is, product cluster analysis may identify that a product cluster has a high failure rate due to commonly failing a specific test. For example, a specific product cluster 121 may be selected by a user reviewing the product cluster analysis and/or by the system (e.g., based on high failure rates) for failure rate reduction. Failure rate reduction mechanisms may include a quality parameter adjustment 130, a process adjustment 160, and/or a formula adjustment 170.

A quality parameter adjustment 130 may be performed to modify the quality parameter windows that define test failure. For example, a specific manufacturing test may require results to fall within a certain window for a product to be considered to pass. The selected quality parameter range may be determined based on previous experience and previous data, but may not accurately relate to performance of the product. In some implementations, it may be suitable to adjust the quality parameter test result to accurately reflect desired or expected results, thus eliminating and/or reducing test failures. In some implementations, the quality parameter window may be adjusted by altering the upper and/or lower bounds. Constraints to the adjustment may be used to prevent the quality parameter window from being altered so significantly as to no longer act as a filter of bad products. Constraints may include, for example, a fixed quality parameter range and/or a limit to how far the quality parameter window can be moved. For example, quality parameter window adjustments may be constrained such that movement of the upper and/or lower bound of the quality parameter window is limited to 10 percent of the window size and the window size (quality parameter range) remains fixed. Quality parameter range adjustment may include adjusting the quality parameter window, under the constraints, to capture as many test results as possible. Quality parameter range adjustments may be applied to all products within a cluster sharing an acceptable quality parameter range for a particular test.

Quality parameter adjustments may be performed according to product testing results that have previously been obtained. Quality parameter adjustments may reduce the product failure rates of previously produced products. Quality parameter adjustments may further reduce the product failure rates of products that are yet to be produced. Quality parameter adjustments made according to the above method may be more accurate in determining the pass/fail of products. Thus, when products are produced in the future, they may be more likely to pass tests under the adjusted quality parameter ranges.

Quality parameter adjustments on clustered products may reduce product failure rates in ways not obtainable without product clustering. For example, several different products may each have failed a specific test with testing scores only slightly higher than the determined acceptable quality parameter range. Such a detail may be difficult to identify through analysis of sparse data on the individual products. Through product clustering, the several different products may be grouped together based on ingredient similarity. Products having similar compositions may perform similarly in post-manufacturing tests.

Process and formula adjustments may be applied to reduce failure rates. A determination as to whether to adjust processes or formulas may be made according to a test failure prediction process 150. Test failure prediction process 150 may be used to determine a predicted test failure rate for a product and, based on an actual test failure rate of the product, determine to adjust a process or a formula of the product.

Test failure prediction 150 may be based according to univariate correlations of test results with product ingredients. Within each product cluster 121, correlations between product ingredients and test results may be determined. Determined correlations may be weighted according to a percentage of an ingredient in a product. For example, within a product cluster 121, several products may have failed the same test, and may each have relatively high percentages of an ingredient in common. That ingredient may then have a high correlation with failure of the test.

Univariate correlations determined according to relationships within a product cluster 121 may be augmented according to relationships across all production data 110. A univariate correlation determined from a first product cluster 121 may be refined, augmented, and/or verified based on a comparison of the univariate correlation with ingredient and test result data of all products in the production data 110. Accordingly, it may be determined whether a specific correlation has predictive or correlative value across all products or whether it is specific to the product cluster 121 from which it was derived.

In some implementations, test failure prediction 150 may be based on multivariate correlations of ingredients with test results. The system may construct multiple linear models within a product cluster 121. For each test type conducted on products within the cluster, a linear model may be built. Each product formula may be considered as a vector of product ingredients. For each test type conducted, a product ingredients vector may be associated with a test result for that product. A linear model for a test type may be built to represent a best fit between the product ingredient vectors and test results for all products within a cluster for a given test type. The model weights may then be extracted as ingredient correlations. The absolute value of each weight represents the strength of the correlation between an ingredient and the result, and the sign of the weight represents the direction of that ingredient's influence. Each linear model may then be used to predict test results according to product ingredients. The predicted test results may be compared to the actual test results to score the accuracy of the model's fit. A multivariate correlation model may then be generated according to the linear model weights and the accuracy of the linear model's fit.

High weights corresponding to an ingredient from the linear model indicate that the ingredient is a good predictor for a test result. The sign indicates whether an increase or decrease of the ingredient influences the test result in a positive or negative fashion. Low weights corresponding to an ingredient may represent either that the ingredient does not have a significant effect on the test result or that the ingredient has an effect on the test result in combination with other ingredients. For example, if all ingredients of a linear model show relatively low weights, but the linear model nonetheless has a high prediction accuracy, then this scenario indicates that it is the combination of ingredients that is a predictor of test results. On the contrary, if all ingredients of a linear model show relatively low weights and the model has poor prediction accuracy, then this scenario indicates that neither the individual ingredients nor the combination of ingredients are strong predictors of test results.

Test failure prediction 150 may be based on univariate correlations, multivariate correlations, and/or a combination of the two. Test failure rates of a given product defined by a specific formula may be predicted according to the correlations derived based on other products in the product cluster 121. Predictions may be made for existing products (e.g., to compare predicted test results to actual test results) and for products that are yet to be produced (e.g., to predict potential failure rates as well as to compare predictions to actual results once tests have been performed).

The system may identify whether a test failure is more likely to be caused by the formula or the process by comparing actual test results to predicted test results. If actual failed test results are similar to predicted failed test results (e.g., a predicted failure is due to results above the quality parameter range and an actual failure is due to results above the quality parameter range or a predicted failure is due to results below the quality parameter range and an actual failure is due to results below the quality parameter range), then test failures are more likely to have been caused by the product formula. That is, because actual test results aligned with results predicted according to the product formula, this indicates that the prediction was accurate and the product formula was the basis for the test failure. On the contrary, if actual failed test results are not similar to predicted failed test results (e.g., a predicted failure is due to results above the quality parameter range and actual results are within or below the quality parameter range or a predicted failure is due to results below the quality parameter range and an actual result is within or above the quality parameter range), then test failures are more likely to have been caused by the process. That is, because actual test results did not align with results predicted according to the product formula, this indicates that the prediction was not accurate and the product formula was less likely to be the basis for the test failure.

Where the process is more likely to be the basis of test failure, then process adjustment process 160 may be carried out to determine aspects of the manufacturing process that may have contributed to test failure. Such analysis may be valuable particularly where aspects of a manufacturing process are manually controlled.

Manufacturing process data may be collected from a plurality of sensors as multiple time series. Each sensor, e.g., of temperature, pressure, motor speed, etc., may record data during processing, capturing data throughout the process, either discretely or continuously. Thus, process data may include a plurality of time series of data, wherein each time series corresponds to a sensor. During processing, different manufacturing steps may occur including, for example, changes in temperature, changes in pressure, changes in mix speed, addition of ingredients, etc. Data windows within the time series data may correspond to specific manufacturing steps. For example, if an increase in temperature is dictated, a time window may correspond to the initiation of the temperature increase until the desired temperature is reached. If product mixing at a certain speed is required, a time window may correspond to the initiation and completion of the mixing movement.

In some implementations, performing automated data analysis of manufacturing process data within multiple batches of the same product may require normalization of manufacturing process data. In such implementations, normalization of the process data may include time series normalization, which may include time series resizing and time series alignment.

Time series alignment may be used to accurately determine the start and end times of product processing. Where product manufacture includes manual oversight and recording, human error may be introduced into the process data. To eliminate human error, time series alignment may be used to identify data markers within the manufacturing time series process data that are indicative of start and end times. Such markers may vary depending on the manufacturing process that is analyzed.

In some implementations, a start-process data marker may be identified according to a relative maximum vessel temperature. In some embodiments, a threshold may be set based on distance in time. For example, in some embodiments, a threshold may be set based on some distance in time (left or right) in which a local maximum can be identified. In some embodiments, the selected local maximum must be the highest value with no other values being within some specified percentage (e.g., 10 percent) of the total time from the selected local maximum. Prior to initiating a manufacturing run, a mixing vessel may be cleaned in a process that involves high temperatures. The last high temperature of the cleaning process, as registered by a temperature sensor, may be selected as the start of a manufacturing process run. In some implementations, an end-process data marker may be identified according to measured pressure changes. Visual inspection of a product during processing may require removing a lid of a mixing vessel, thus changing vessel pressure. The last measured pressure change may indicate an end of a manufacturing process.

In some implementations, time series resizing may include normalization of time series length. Although multiple batches of the same product require the same processing steps, such steps may differ in length according to an amount of product being manufactured. For example, a 200 kg batch of product will heat up faster than an 800 kg batch of product. Time series length may be normalized transforming time measurements to percentage measurements. Accordingly, 1 minute of a 10 minute time series may be understood as 10 percent. When comparing a normalized 20 minute time series to a normalized 10 minute time series, 10 percent blocks (corresponding to 2 minutes of the 20 minute series and 1 minute of the 10 minute series) may be analyzed together.

Manufacturing data from successful and unsuccessful product runs may be separated for analysis. For each successful product run, the corresponding multiple time series may be separated into windows. In some implementations, each window may include 10 percent of the total time series. For example, manufacturing data may include three temperature time series, as measured by sensors located in different areas of a mixing vessel, one pressure time series as measured by a pressure sensor, and a mixing speed time series as measured by a motor sensor. Each of these five time series may be separated into ten windows, each including 10 percent of the total process data. For each sensor and each window, time series data may be compared across the successful product runs to produce a mean and a standard deviation of the sensor readings. Thus, for each of the five sensors in each of the ten time windows, a mean and standard deviation of the sensor reading may be computed for the successful product runs. These means and standard deviations may serve as a template for a successful product manufacturing run and may enable a system user to discover process areas as causes of failure in unsuccessful product runs. The size and number of the time windows may be adjusted to better suit the manufacturing process without deviating from the scope of this disclosure. It is not necessary that all time windows be of the same size, and varying their sizes may provide additional insight. The above example is illustrative only, and manufacturing processes consistent with the disclosed technology may include any number and type of sensors.

Failed product runs may be compared against the template for the successful product manufacturing run either individually or as a group. Compared individually, the time series of each failed product run may be normalized and broken into time windows similar to the successful product runs. Sensor readings for each time window may be compared to those of the template and readings of the failed run that fall outside of a predetermined template range (e.g., mean+/−one, two, or three standard deviations) may be flagged as potential failure indicators. The system may determine the process areas most likely to have caused test failure according to the prevalence of failure indicators. For example, if three failed product run data sets all show a failure indicator in the same time window for the same sensor, such information may indicate that these deviations are likely to have contributed to test failure. Failed product runs may also be compared as a group. The failed product runs may be combined in the manner described above for the successful product runs to determine a mean and standard deviation for each sensor and time window. These computed ranges may be compared to the template ranges to identify deviations from the successful product run. Deviations may be flagged as potential failure indicators.

In some implementations, the system may recommend portions of the manufacturing process that may benefit from more stringent control, more oversight, and/or other changes based at least in part on comparisons made between successful runs and unsuccessful runs, as described above. Eliminating deviations from the process template may serve to decrease failure rates.

When the product formula is more likely to be the basis of test failure, then formula adjustment process 170 may be carried out to determine aspects of the formula that may have contributed to test failure. As discussed above, correlations (e.g., univariate and/or multivariate) may be established between ingredient percentages and testing results.

Formula adjustment process 170 may be used to identify ingredients most highly correlated with test failure and the ingredient percentages correlated with test failure. The system may recommend reducing or eliminating ingredients highly correlated with testing failure. Where multivariate analysis has identified multiple ingredients that correlate with testing failure in combination, the system may recommend the reduction or elimination of one or more of these ingredients. Formula adjustment process 170 may provide a predicted risk of failure of an adjusted formula, based on multivariate and univariate correlations. For example, a user may be reviewing product data of a particular product that has frequently failed testing. An ingredient of the product, e.g., ingredient X, may be highly correlated with testing failure based on product cluster 121 analysis. The user may adjust an amount of ingredient X in the formula and request that the system reevaluate the new formula. The new formula may then be evaluated according to the correlation model to determine a risk of testing failure. Thus, a user may gain insight into formula changes prior to production.

In some implementations, the system may predict test results of new products that have not been produced based on a new product creation process 145. In such implementations, the system can obtain production data for a new product. Next, the system can cluster the product data as described above. The system may then use the univariate and multivariate formula correlation models developed at test failure prediction process 150 to determine alterations to the product formula. For example, the system may analyze a new product formula of a potential product, predict potential test failures according to the clustering and correlation models, and recommend alterations to the product formula accordingly.

Example System Architecture

Figure 2:
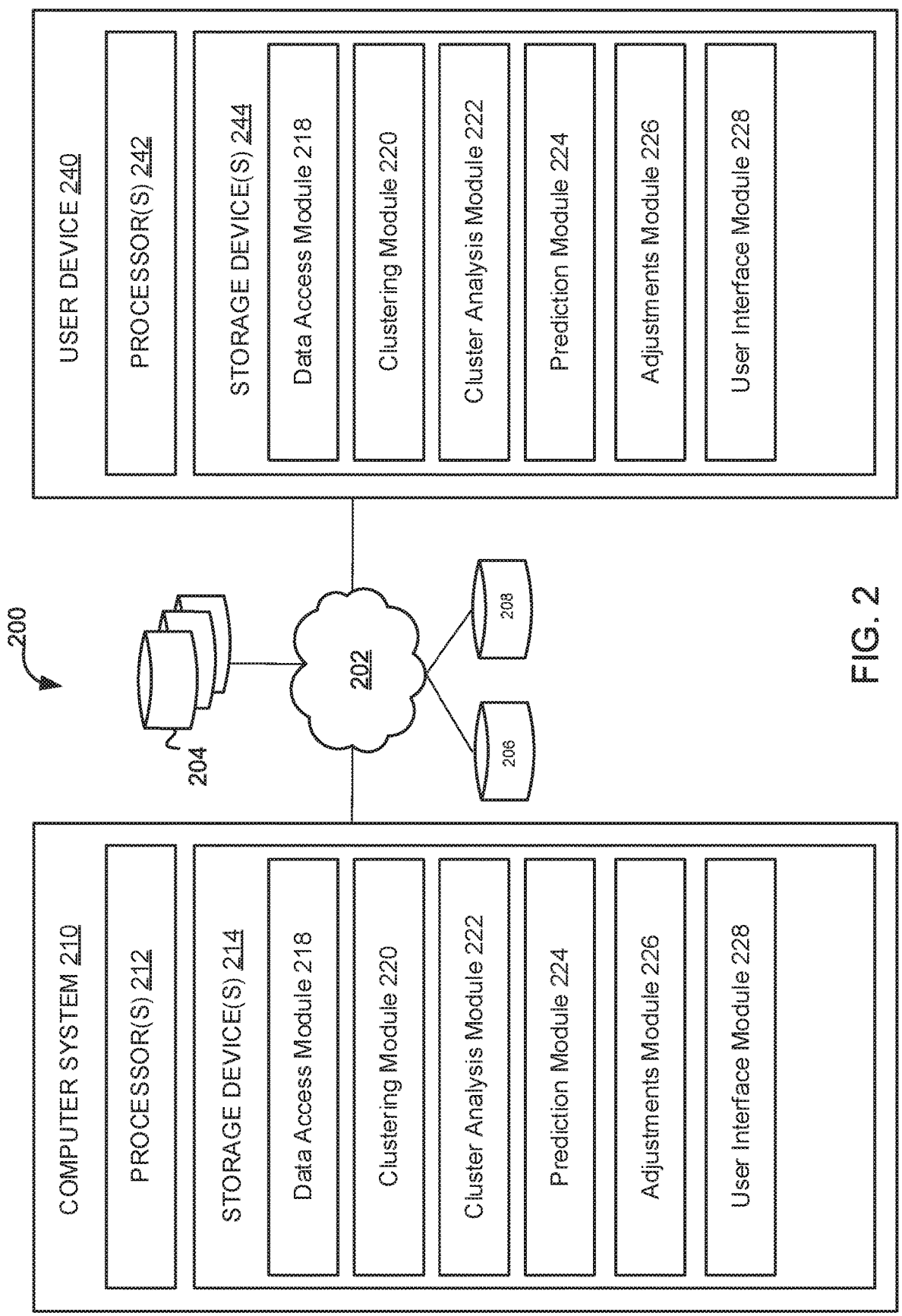
FIG. 2 illustrates an exemplary system for reducing product manufacturing failure rates.

FIG. 2 depicts a system 200 for reducing manufacturing failure rates. In some implementations, the system 200 may include a computer system 210, a user device 240, a product data database 204, and/or other components, in communication using a network 202. Product data database 204 is illustrated in FIG. 2 as separate from computer system 210 and user device 240. In some implementations, product data database 204 may be stored on the computer system 210, user device 240, or at a remote location. Additionally, system 200 may include manufacturing data database 206 and clustering data database 208, each of which may be stored remotely, on computer system 210, and/or on user device 240.

Computer system 210 may be configured as a server (e.g., having one or more server blades, processors, etc.), a personal computer (e.g., a desktop computer, a laptop computer, etc.), a smartphone, a tablet computing device, and/or other device that can be programmed to receive defect data objects, analyze defect data objects, and determine relationships between defect data objects.

Figure 4:
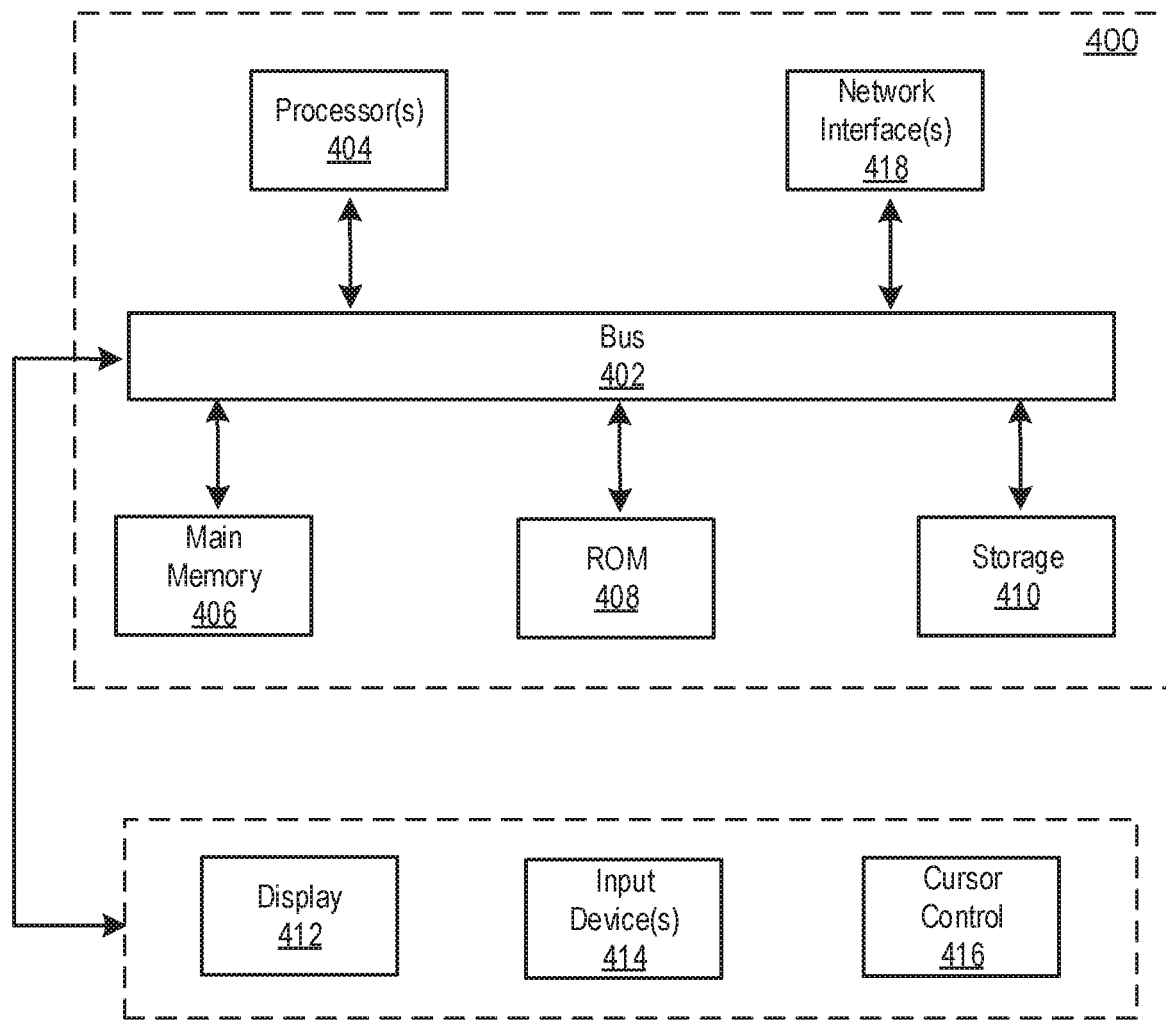
FIG. 4 illustrates a block diagram of an example computer system in which any of the embodiments described herein may be implemented.

Computer system 210 may include one or more processors 212 (also interchangeably referred to herein as processors 212, processor(s) 212, or processor 212 for convenience), one or more storage devices 214, and/or other components. Processors 212 may be programmed by one or more computer program instructions stored on storage device 214. For example, processors 212 may be programmed by data access module 218, clustering module 220, cluster analysis module 222, prediction module 224, adjustments module 226, user interface module 228, and/or other instructions that program computer system 210 to perform various operations, each of which are described herein. As used herein, for convenience, the various instruction modules will be described as performing an operation, when, in fact, the various instructions program the processors 212 (and therefore computer system 210) to perform the operation. Further details and features of a computer system 210 configured for implementing features of the described technology may be understood with respect to computer system 400 as illustrated in FIG. 4.

User device 240 may be configured as a server device, a gaming console, a handheld gaming device, a personal computer (e.g., a desktop computer, a laptop computer, etc.), a smartphone, a tablet computing device, and/or other device that can be programmed to receive defect data objects, analyze defect data objects, and determine relationships between defect data objects.

User device 240 may include one or more processors 242 (also interchangeably referred to herein as processors 242, processor(s) 242, or processor 242 for convenience), one or more storage devices 244, and/or other components. Processors 242 may be programmed by one or more computer program instructions. For example, processors 242 may be programmed by data access module 218, clustering module 220, cluster analysis module 222, prediction module 224, adjustments module 226, user interface module 228, and/or other instructions that program computer system 210 to perform various operations, each of which are described in greater detail herein. As used herein, for convenience, the various instruction modules will be described as performing an operation, when, in fact, the various instructions program the processors 242 (and therefore user device 240) to perform the operation.

Various aspects of the failure rate reduction system may operate on computer system 210 and/or on user device 240. That is, the various modules described herein may each operate on one or both of computer system 210 and/or user device 240 either alone or in combination. In some implementations, all functions may operate on a single one of computer system 210 or user device 240, and only one of these is necessary to carry out all system functionality.

Data access module 218 may be a software module. Data access module 218 may be configured to access, i.e., read from and write to, memory units associated with system 200. Data access module 218 may access product data, for example, from product data database 204. The data access module 218 may access manufacturing data, for example, from manufacturing data database 206. Further, the data access module 218 may access clustering data, for example, from clustering data database 208. In some embodiments, the data access module 218 may access the relevant data (e.g., product data, manufacturing data, etc.) from a single data source (e.g., database). In such embodiments, clustered data (e.g., clustered product data) may also be accessed from the same data source. In some embodiments, some clustered data may be obtained from and/or provided by third-party sources.

Product data database 204 may store production data 110, i.e., any and all information related to one or more manufactured products. Production data 110 may include information about manufactured products, including formulas, associated production processes, bills of materials, tests conducted, test results, and/or any other suitable information about the production of products. Manufacturing data database 206 may store information captured during product production or manufacturing. Such information may include sensor data recorded during production, stored as time-series data of sensor measurements. Manufacturing data may include multiple data time series, obtained via different sensors, for each manufactured product.

Clustering module 220 may be a software module. Clustering module 220 may be configured to perform a clustering process or operation on the products stored in product data database 204. Clustering module 220 may group products having similar characteristics in clusters. Clustering module 220 may use any stored data about the products for clustering purposes, including ingredients, production processes, etc.

In some implementations, clustering module 220 may use a TF-IDF method to score the ingredients of each product. The TF-IDF method scores the ingredients of each product according to their percentage weight in their product, reduced by a factor related to the frequency of the ingredient in all products. Thus, rarer ingredients and ingredients that compose a greater proportion of a product's ingredients will receive higher scores. Clustering module may cluster the products using the TF-IDF ingredient scores. Any suitable clustering method may be used, including, for example, k-means and k-means++. In some implementations, k-means++ may be used for clustering with a predetermined number of clusters. The user may select the predetermined number of clusters prior to implementing the k-means++ clustering and may adjust the cluster number to achieve a suitable cluster size. The user may view the clusters and adjust the cluster numbers through a user interface generated that is provided by the user interface module 228. Clustering module 220 may engage data access module 218 to store the determined product clusters 121 in product clustering data database 208.

Cluster analysis module 222 may be a software module. Cluster analysis module 222 may be configured to analyze product clusters 121 to select and/or prioritize product clusters for failure rate reduction. Product clusters 121 having high failure rates may be prioritized by cluster analysis module for failure rate reduction. In some implementations, high failure rate clusters may be recommended to a user by the system. In some implementations, cluster data may be reviewed by a user through a user interface provided by user interface module 228.

In some implementations, cluster analysis module 222 may determine manufacturing risk scores for one or more products in a cluster. Manufacturing risk scores may be determined according to a number of times manufactured, attempts to manufacture since the last failure, the date of last manufacture, and the overall failure rate. Each of these factors may be weighted based on analysis of product failure rates for each product in a cluster. The weighted factors may then be used by cluster analysis module 222 to determine an overall failure risk of attempting to manufacture the product again. The overall failure risk may include a risk of the manufactured product failing any test.

Prediction module 224 may be a software module. Prediction module 224 may be configured to predict the failure rates of specific products for specific tests. Prediction module 224 may be configured to compare predicted failure rates to actual failure rates to determine modes of test failure. The determined test failure modes may be used by adjustments module 226, as described below, to reduce overall test failure rates.

Prediction module 224 may be configured to determine predicted failure rates based on univariate correlations between product ingredients and test failures within a product cluster 121. That is, for the products within a specific cluster, prediction module may compute a correlation relationship between the amount of an ingredient in each product and the measured result for each conducted test. Prediction module 224 may be configured to construct a correlation model to project test results according to ingredient amounts in a product. Thus, based on the test results of each product in a cluster, prediction module 224 may determine the effect that each ingredient in the products may have on the test results. The correlation model may therefore permit a user to predict the result of a test according to the ingredients of a product. The predicted result of the test may include the test result value and/or a determination of test passing or failure.

Prediction module 224 may further be configured to determine test results according to multivariate correlations between multiple ingredients of products within a cluster and test results within the cluster. The determined multivariate correlations may be used by prediction module 224 to determine a multivariate correlation model for predicting test results of a product according to the product's formula.

In some implementations, prediction module 224 may combine the univariate correlation results and the multivariate correlation results to determine a unified correlation model for predicting test results of a product according to the product's formula.

In some implementations, prediction module 224 may be configured to determine a test failure mode of a product, based on one or more correlation model. Prediction module 224 may identify whether a test failure is more likely to be caused by a product formula or a production process by comparing actual test results to correlation model predicted test results. If actual failed test results are similar to predicted failed test results (e.g., a predicted failure is due to results above the quality parameter range and an actual failure is due to results above the quality parameter range or a predicted failure is due to results below the quality parameter range and an actual failure is due to results below the quality parameter range) test failures are most likely to have been caused by the product formula. If actual failed test results are not similar to predicted failed test results (e.g., a predicted failure is due to results above the quality parameter range and actual results are within or below the quality parameter range or a predicted failure is due to results below the quality parameter range and an actual result is within or above the quality parameter range) test failures are most likely to have been caused by the process. Accordingly, prediction module 224 may determine whether a test failure mode is based on product formula or production process through a comparison between actual test results and correlation model predicted test results.

Adjustments module 226 may be a software module. Adjustments module 226 may be configured to provide recommended adjustments to test quality parameter, product formulas, and/or product processes. Adjustments module 226 may be configured to reduce failure rates of a product selected by a user and/or prioritized by cluster analysis module 222.

Adjustments module 226 may be configured to determine adjustments to test quality parameters to reduce failure rates of a selected test within a product cluster (e.g., a product cluster 121 as described in reference to FIG. 1). A test for quality parameter adjustment may be selected according to cluster analysis determining that a large number of products have failed the test. Test quality parameters may not always accurately reflect product quality. That is, test results outside of a testing quality parameter range, in some cases, may not indicate that the tested product is faulty or of low quality. Adjustment of a testing quality parameter range may be carried by adjustments module 226 to capture more products within the approved range. Adjustments module 226 may be configured to adjust the quality parameter range of all products within a cluster having the same quality parameter range for the selected test. Adjustments module 226 may operate under constraints, e.g., the quality parameter range must remain the same size, the quality parameter range may only be shifted by a predetermined amount, etc. Operating within the constraints, adjustments module 226 may select a quality parameter range that captures the largest number of product test results. That is, based on all products within a cluster having a same quality parameter range for a selected test, the quality parameter range may be adjusted to minimize the number of products having a failing test result.

Adjustments module 226 may be configured to determine adjustments to product processes to reduce test failure rates of the selected product. The selected product may be selected for process adjustment based on a failure mode determination by prediction module 224. Adjustments module 226 may access manufacturing data database 206 to obtain product manufacturing data, including time series data collected from a plurality of sensors during the manufacture of a selected product. Adjustments module 226 may be configured to normalize time series sensor data collected during the manufacture of multiple batches of the selected product. Successful batches, with no test failures, may be grouped together to generate a success template. Adjustments module 226 may divide the normalized time series sensor data of the successful batches into a plurality of time windows. Adjustments module 226 may compute the mean and standard deviation of sensor data within each time window. The result of this computation is the success template, defined by a mean and standard deviation for each sensor result within each time window.

Adjustments module 226 may compare the time series data of failed batches to the success template to determine where and how the failed batches deviated from the success template. Adjustments module 226 may identify a deviation where sensor data from a failed batch departs from the mean of the success template by more than a predetermined number of standard deviations (e.g., 1, 2, 3 standard deviations). Adjustments module 226 may identify one or more sensor/time window combinations in which each failed batch deviated from the success template. Adjustments module 226 may recommend that the product process be altered, reviewed, monitored, and/or subject to greater oversight according to the identified sensor/time window combinations. For example, if a series of failed batches each have a low temperature sensor reading during a specific time window, adjustments module 226 may provide a recommendation to provide increased vessel heating during the specific time window.

Adjustments module 226 may be configured to determine adjustments to product formulas to reduce test failure rates of the selected product. The selected product may be selected for formula adjustment based on a failure mode determination by prediction module 224. Adjustments module 226 may determine which ingredients of the product formula are most highly correlated with the test failures associated with the selected product based on one or more of the correlation models generated by prediction module 224. Adjustments module 226 may apply the one or more correlation models to recommend ingredient adjustments that, if applied, would lead to a predicted passing test results. Adjustments module 226 may be configured to generate one or more ingredient adjustment recommendations. For example, a first ingredient and a second ingredient may both be correlated with a failing test result. Adjustments module 226 may recommend that a first ingredient adjustment or a second ingredient adjustment be applied. A user may select which ingredient adjustment to apply based on additional knowledge of the importance of the first and second ingredient to the product. In some implementations, adjustment module 226 may recommend ingredient adjustments based on an analysis of a plurality of failing test results. That is, adjustments module 226 may recommend an ingredient adjustment to remedy multiple failing test results. In some implementations, adjustments module 226 may recommend multiple ingredient adjustments based on results of the multivariate correlation model and/or the unified correlation model. As these models may illustrate correlations between combinations of ingredients and test results, adjustments module 226 may recommend a combination of ingredient adjustments.

In some implementations, adjustments module 226 may interact with user interface module 228 to provide a user interface permitting a user to see the predicted test results of ingredient adjustments entered manually by a user. For example, a user may wish to adjust a product formula manually after reviewing the adjustment recommendations. Adjustments module 226 may recalculate predicted test results as the user adjusts product formulas via the user interface.

User interface module 228 may be a software module operating on computer system 210. User interface module 228 may be configured to provide a user interface permitting a user to interact with one or more of the system modules described herein. As described herein, many of the modules may function autonomously, generating results and providing suggestions, recommendations, and other results. User interface module 228 may interface with each of the other modules of the system to permit a user to interact with each module. For example, a user may wish to manually adjust the clustering of clustering module 220, may wish to review the cluster analysis of cluster analysis module 222, may wish to manually enter adjustments using adjustments module 226, etc. User interface module 228 may provide a graphical user interface with which a user may interact via any suitable input, including keyboard, mouse, touchscreen, touchpad, trackball, voice, etc.

In some implementations, user interface module 228 may access prediction module 224 to provide a user with a tool to predict test results of new products that have yet to be manufactured. For example, a user that wishes to manufacture a new product may enter the proposed product components description and process instructions into a user interface. Prediction module 224 may process the entered new product data, cluster the product data using the approaches described herein, and analyze the clustered product data according to one or more correlation models to predict test result ranges, as described above. The user may then adjust the product data to achieve optimal (e.g., passing) predicted test results. In some implementations, prediction module 224 may provide suggestions and/or recommendations to the user of product data adjustments to achieve passing predicted test results. In some embodiments, the product components description can describe a list of the raw materials, sub-assemblies, intermediate assemblies, sub-components, parts and/or the quantities of each needed to manufacture an end product.

Although illustrated in FIG. 1 as a single component, computer system 210 and user device 240 may each include a plurality of individual components (e.g., computer devices) each programmed with at least some of the functions described herein. In this manner, some components of computer system 210 and/or user device 240 may perform some functions while other components may perform other functions, as would be appreciated. The one or more processors 212 may each include one or more physical processors that are programmed by computer program instructions. The various instructions described herein are exemplary only. Other configurations and numbers of instructions may be used, so long as the processor(s) 212 are programmed to perform the functions described herein.

Furthermore, it should be appreciated that although the various instructions are illustrated in FIG. 2 as being co-located within a single processing unit, in implementations in which processor(s) 212 includes multiple processing units, one or more instructions may be executed remotely from the other instructions.

Additionally, the modular software breakdown as illustrated in FIG. 2 is prepared for illustrative purposes only. The various instructions described with respect to specific software modules may be implemented by alternative software modules configured in different arrangements and with alternative function sets.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 212 may be programmed by one or more additional instructions that may perform some or all of the functionality attributed herein to one of the instructions.

The various instructions described herein may be stored in a storage device 214, which may comprise random access memory (RAM), read only memory (ROM), and/or other memory. The storage device may store the computer program instructions (e.g., the aforementioned instructions) to be executed by processor 212 as well as data that may be manipulated by processor 212. The storage device may comprise floppy disks, hard disks, optical disks, tapes, or other storage media for storing computer-executable instructions and/or data.

The various components illustrated in FIG. 1 may be coupled to at least one other component via a network 202, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 2, as well as in other drawing Figures, different numbers of entities than those depicted may be used. Furthermore, according to various implementations, the components described herein may be implemented in hardware and/or software that configure hardware.

Product data database 204, manufacturing data database 206, and clustering data database 208, described herein may be, include, or interface to, for example, any type of generally available database. For example, databases or other data storage, including file-based, or query formats, platforms, or resources such as OLAP (On Line Analytical Processing), SQL (Structured Query Language), a SAN (storage area network), or others may also be used, incorporated, or accessed. The databases may comprise one or more such databases that reside in one or more physical devices and in one or more physical locations. The database may store a plurality of types of data and/or files and associated data or file descriptions, administrative information, or any other data.

Operation of computer system 210 and/or user device 240 according to the above described software modules may proceed as follows, with respect to FIG. 3.

Figure 3:
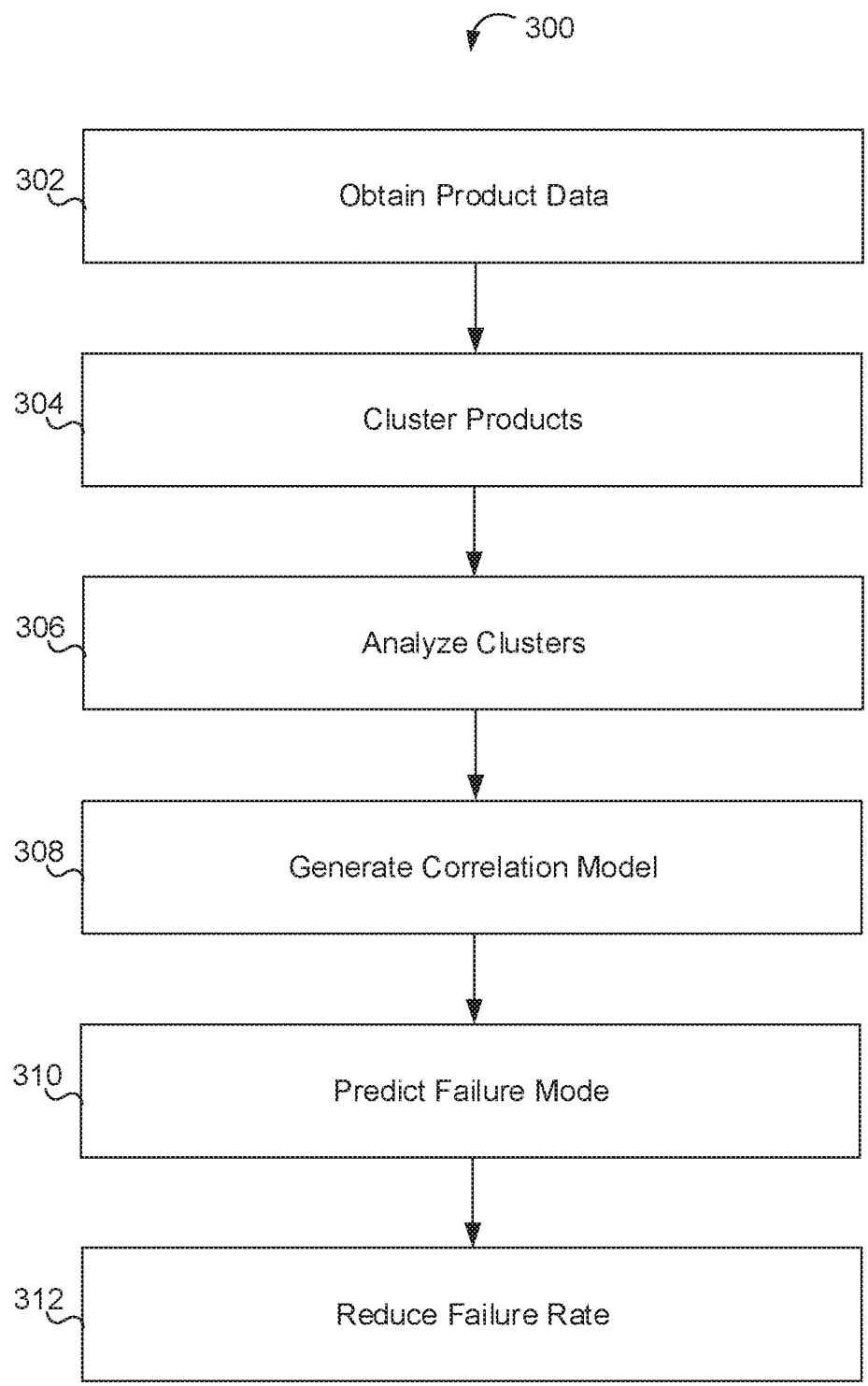
FIG. 3 illustrates a flow chart of a method for reducing product manufacturing failure rates.

FIG. 3 depicts a process 300 for reducing manufacturing failure rates, according to some embodiments. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include obtaining product data. In various embodiments, obtaining the product data may involve data retrieval, data integration, and/or data creation (e.g., a user entering a desired new formula directly through a graphical interface and/or API). Data access module 218 may be employed to access production data (e.g., production data 110) stored in product data database 204. Production data may include one or more product data sets, each including product formulas, a plurality of product examples, and test results of the plurality of product examples.

In an operation 304, process 300 may include clustering products of the product data set. Product clustering may be performed according to any feature of the product data set, including, e.g., product formula, production processes of each product, test results, and any other aspect of the data. In some implementations, products may be clustered according to TF-IDF scoring of their ingredients based on a k-means++ algorithm.

In an operation 306, process 300 may include cluster analysis. Cluster analysis module 222 may analyze the product clusters. According to the product cluster analysis, cluster analysis module 222 may determine specific tests most frequently failed within a product cluster. According to the product cluster analysis, cluster analysis module 222 may determine which product clusters have the highest rates of test failure. According to the product cluster analysis, cluster analysis module 222 may determine specific products within a cluster that have highest failure rates. Based on product cluster analysis and product data, the cluster analysis module 222 may determine future manufacturing risk of a specific product.

In an operation 308, process 300 may include correlation model generation. Prediction module 224 may analyze test failure data within a cluster to generate one or more correlation models based on correlations between product ingredients and product test results.

In an operation 310, process 300 may include failure mode prediction. Prediction module 224 may determine predicted test results for one or more products within a product cluster according to the one or more correlation models. Prediction module 224 may determine a failure mode of failed tests according to a comparison between correlation model predicted test results and actual test results.

In an operation 312, process 300 may include providing failure rate reduction recommendations. Failure rate reduction may be performed by adjustment module 226. Adjustments module 226 may adjust at least one of a quality parameter range, a product formula, and a product process to reduce failure rates.

Adjustments module 226 may adjust the quality parameter range of a selected test for all products within a cluster that share the quality parameter range for the selected test. A new quality parameter range may be selected to minimize failing test results.

Adjustments module 226 may recommend adjustments to a product formula according to one or more correlation models. The product formula adjustments may be recommended such that predicted test results of the adjusted product formula may fall within acceptable quality parameter ranges.

Adjustments module 226 may recommend adjustments to a product process. Adjustments module 226 may determine a process success template according to aggregated manufacturing data of successful product batches. Adjustments module 226 may compare manufacturing data of failed product batches to the success template. Adjustments module 226 may recommend alterations to product processing according to differences between the manufacturing data of the failed product batches and the success template.

Thus, process 300 may operate to receive defect information and store the defect information as data objects. Process 300 may further operate to compare the stored information to identify relationships between defects and generate issues comprising multiple related defects. User selection and approval of issues may further be employed to update analysis models for more accurate defect relationship identification.

FIG. 4 depicts a block diagram of an example computer system 400 in which any of the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a cathode ray tube (CRT) or LCD display (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may retrieves and executes the instructions. The instructions received by main memory 406 may optionally be stored on storage device 410 either before or after execution by processor 404.

The computer system 400 also includes a communication interface 418 coupled to bus 402. Communication interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN (or WAN component to communicated with a WAN). Wireless links may also be implemented. In any such implementation, communication interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418.

The received code may be executed by processor 404 as it is received, and/or stored in storage device 410, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for reducing failure rates of a manufactured product comprising:
   one or more processors; and
   memory storing instructions that, when executed by the one or more processors, cause the system to perform:
      receiving, from a database, a first product data set, the first product data set including a first product formula, a plurality of first product examples, and first test results of the plurality of first product examples;
      receiving, from the database, a second product data set, the second product data set including a second product formula, a plurality of second product examples, and second test results of the plurality of second product examples;
      clustering, by a machine learning technique, a product cluster including the first product data set and the second product data set according to the first product formula and the second product formula;
      generating, based on the clustering, a correlation model according to an in-common ingredient in the first product formula and the second product formula and an in-common test result of the first test results and the second test results;
      predicting, based on the correlation model, a test result of the first test results;
      determining, based on the predicted test result and an actual test result of the first test results, a test failure mode; and
      determining, based on the test failure mode, a failure rate reduction mechanism of at least a product of the product cluster.

2. The system of claim 1, wherein the system is further caused to perform:
   selecting one of a first product or a second product as a selected product for failure rate reduction according to a comparison between the first test results of the plurality of first product examples and the second test results of the plurality of second product examples; and
   determining the failure rate reduction mechanism of the selected product.

3. The system of claim 2, wherein the determining of the failure rate reduction mechanism of the product cluster further causes the system to perform:
   determining a formula adjustment of the selected product.

4. The system of claim 1, wherein the determining of the failure rate reduction mechanism of the product cluster further causes the system to perform:
   receiving a plurality of additional product data sets including a plurality of additional product formulas;
   scoring the first product formula according to a weight of ingredients of the first product formula and a frequency of ingredients of the first product formula, the second product formula, and the plurality of additional product formulas;
   scoring the second product formula according to a weight of ingredients of the second product formula and a frequency of ingredients of the first product formula, the second product formula, and the plurality of additional product formulas; and
   determining the failure rate reduction mechanism of the product cluster according to a comparison of the score of the first product and the score of the second product.

5. The system of claim 1, wherein the determining of the failure rate reduction mechanism of the product cluster further causes the system to perform:
   identifying a selected test, wherein at least one of the first test results and second test results includes a failing result for the selected test; and
   modifying a passing quality parameter range of the selected test such that the failing result is within a modified passing quality parameter range of the selected test.

6. The system of claim 5, wherein the system is further caused to perform:
   receiving a plurality of additional product data sets including a plurality of additional test results; and
   identifying the selected test according to a frequency of failing results for the selected test among the first test results, the second test results, and the plurality of additional test results.

7. A computer implemented method for reducing failure rates of a manufactured product, the method being performed on a computer system having one or more physical processors programmed with computer program instructions that, when executed by the one or more physical processors, cause the computer system to perform the method, the method comprising:
   receiving, from a database, a first product data set, the first product data set including a first product formula, a plurality of first product examples, and first test results of the plurality of first product examples;
   receiving, from the database, a second product data set, the second product data set including a second product formula, a plurality of second product examples, and second test results of the plurality of second product examples;
   clustering, by a machine learning technique, a product cluster including the first product data set and the second product data set according to a comparison between the first product formula and the second product formula;

generating, based on the clustering, a correlation model according to an in-common ingredient in the first product formula and the second product formula and an in-common test result of the first test results and the second test results;

predicting, based on the correlation model, a test result of the first test results;

determining, based on the predicted test result and an actual test result of the first test results, a test failure mode; and determining, based on the test failure mode, a failure rate reduction mechanism of at least a product of the product cluster.

8. The computer implemented method of claim 7, wherein the system is further caused to perform:

selecting one of a first product or a second product as a selected product for failure rate reduction according to a comparison between the first test results of the plurality of first product examples and the second test results of the plurality of second product examples; and determining the failure rate reduction mechanism of the selected product.

9. The computer implemented method of claim 8, wherein the determining of the failure rate reduction mechanism of the product cluster further causes the system to perform:

determining a formula adjustment of the selected product.

10. The computer implemented method of claim 7, wherein the determining of the failure rate reduction mechanism of the product cluster further causes the system to perform:

receiving a plurality of additional product data sets including a plurality of additional product formulas;

scoring the first product formula according to a weight of ingredients of the first product formula and a frequency of ingredients of the first product formula, the second product formula, and the plurality of additional product formulas;

scoring the second product formula according to a weight of ingredients of the second product formula and a frequency of ingredients of the first product formula, the second product formula, and the plurality of additional product formulas; and determining the failure rate reduction mechanism of the product cluster according to a comparison of the score of the first product and the score of the second product.

11. The computer implemented method of claim 7, wherein the determining of the failure rate reduction mechanism of the product cluster further causes the system to perform:

identifying a selected test, wherein at least one of the first test results and second test results includes a failing result for the selected test; and modifying a passing quality parameter range of the selected test such that the failing result is within a modified passing quality parameter range of the selected test.

12. The computer implemented method of claim 11, wherein the system is further caused to perform:

receiving a plurality of additional product data sets including a plurality of additional test results; and identifying the selected test according to a frequency of failing results for the selected test among the first test results, the second test results, and the plurality of additional test results.

13. A non-transitory computer readable medium comprising instructions that, when executed, cause one or more processors to perform:

receiving, from a database, a first product data set, the first product data set including a first product formula, a plurality of first product examples, and first test results of the plurality of first product examples;

receiving, from the database, a second product data set, the second product data set including a second product formula, a plurality of second product examples, and second test results of the plurality of second product examples;

clustering, by a machine learning technique, a product cluster including the first product data set and the second product data set according to a comparison between the first product formula and the second product formula; and generating, based on the clustering, a correlation model according to an in-common ingredient in the first product formula and the second product formula and an in-common test result of the first test results and the second test results;

predicting, based on the correlation model, a test result of the first test results;

determining, based on the predicted test result and an actual test result of the first test results, a test failure mode; and determining, based on the test failure mode, a failure rate reduction mechanism of at least a product of the product cluster.

14. The non-transitory computer readable medium of claim 13, wherein the non-transitory computer readable medium is further caused to perform:

selecting one of a first product or a second product as a selected product for failure rate reduction according to a comparison between the first test results of the plurality of first product examples and the second test results of the plurality of second product examples; and determining the failure rate reduction mechanism of the selected product.

15. The non-transitory computer readable medium of claim 14, wherein the determining of the failure rate reduction mechanism of the product cluster further causes the non-transitory computer readable medium to perform:

determining a formula adjustment of the selected product.

16. The non-transitory computer readable medium of claim 14, wherein the determining of the failure rate reduction mechanism of the product cluster further causes the non-transitory computer readable medium to perform:

receiving a plurality of additional product data sets including a plurality of additional product formulas;

scoring the first product formula according to a weight of ingredients of the first product formula and a frequency of ingredients of the first product formula, the second product formula, and the plurality of additional product formulas;

scoring the second product formula according to a weight of ingredients of the second product formula and a frequency of ingredients of the first product formula, the second product formula, and the plurality of additional product formulas; and determining the failure rate reduction mechanism of the product cluster according to a comparison of the score of the first product and the score of the second product.

17. The non-transitory computer readable medium of claim 14, wherein the determining of the failure rate reduction mechanism of the product cluster further causes the non-transitory computer readable medium to perform:
   identifying a selected test, wherein at least one of the first test results and second test results includes a failing result for the selected test; and
   modifying a passing quality parameter range of the selected test such that the failing result is within a modified passing quality parameter range of the selected test.

* * * * *